July 26, 1927.  P. B. J. GRIVEAU  1,636,861

DENTAL FORCEPS

Filed Jan. 25, 1926

Pierre Bertrand Jacques Griveau
Inventor.
By
Attorneys.

Patented July 26, 1927.

1,636,861

UNITED STATES PATENT OFFICE.

PIERRE BERTRAND JACQUES GRIVEAU, OF PARIS, FRANCE.

DENTAL FORCEPS.

Application filed January 25, 1926, Serial No. 83,693, and in France August 21, 1925.

The present invention has for its object a special dental forceps for the extraction of the lower molar teeth of six to twelve years growth.

Each of the jaws of this dental forceps comprising two gripping members integrally formed and corresponding to the two roots of a molar tooth, the invention consists in the fact that the two gripping members of each jaw are separated by a middle notch of such size as to contain the upper part of the inter-alveolar wall without damage to this wall, when the jaws are inserted into the alveoli of the maxillary bone in order to seize both roots at the same time.

By reason of the notch thus formed between the two gripping members, these latter may seize the two roots of the molar tooth at a point below its crown, and the tool will not make contact with the inter-alveolar wall; since this wall is not damaged, the abundant hemorrhage usually caused when this wall is broken will now be obviated.

The appended drawings which are given by way of example show an embodiment of the said invention.

Figure 1:
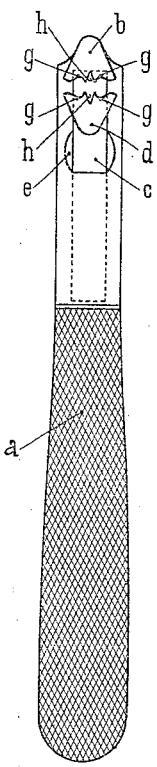
Figure 2:
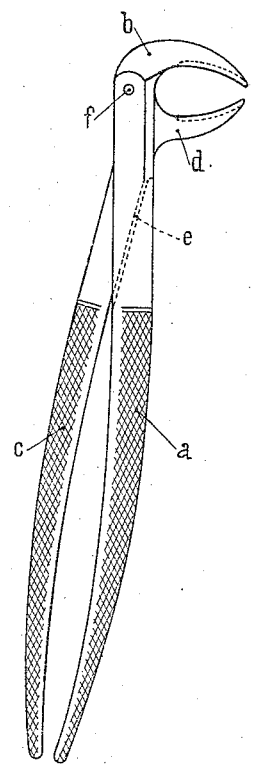
Figure 3:
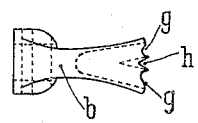

Figure 1 is a front view of the dental forceps, and Figure 2 a corresponding side view. Figure 3 is a plan view.

The said device consists of two parts, of which the first part comprises the handle $a$ and the upper jaw $b$, whilst the second part comprises the handle $c$ and the lower jaw $d$. The handle $a$ is apertured below the jaw $b$ at $e$ for the insertion of the handle $c$ which is pivoted on the axle $f$.

Each of the said jaws comprises two gripping elements $g$ respectively situated in the opposite position, which are recessed in order to conform to the molar tooth at the level of the roots. Between the two gripping elements of each jaw is the notch $h$.

Obviously, the said device is susceptible of various modifications as concerns the shape, and size of the several parts, the accessory dispositions, the material employed and the details of construction, without departing from the principle of the invention.

Having thus described my invention, what I claim is:—

Dental-forceps for the extraction of the lower molar teeth of six to twelve years growth consisting of a pair of pliers with double jaws, each jaw comprising a middle notch between two gripping members integrally formed, said notch adapted to contain without damaging it the upper part of the inter-alveolar wall, while both gripping members seize the roots under the crown of the tooth.

In testimony whereof I affix my signature.

PIERRE BERTRAND JACQUES GRIVEAU.